(12) United States Patent
Teramachi et al.

(10) Patent No.: US 7,519,443 B2
(45) Date of Patent: Apr. 14, 2009

(54) INFORMATION SIGNAL REPRODUCING APPARATUS

(75) Inventors: Kazuhiko Teramachi, Kanagawa (JP); Yutaka Sato, Kanagawa (JP); Shinichi Inoue, Saitama (JP)

(73) Assignee: Sony Corporation (JP)

( * ) Notice: Subject to any disclaimer, the term of this patent is extended or adjusted under 35 U.S.C. 154(b) by 44 days.

(21) Appl. No.: 11/638,779

(22) Filed: Dec. 14, 2006

(65) Prior Publication Data

US 2007/0100485 A1    May 3, 2007

Related U.S. Application Data

(63) Continuation of application No. 09/799,483, filed on Mar. 5, 2001, now Pat. No. 7,248,935.

(30) Foreign Application Priority Data

Mar. 6, 2000    (JP)    ............................. P2000-060492

(51) Int. Cl.
  G06F 17/00    (2006.01)
  H04R 29/00    (2006.01)
(52) U.S. Cl. ............................. 700/94; 381/56; 381/104
(58) Field of Classification Search .................... 700/94; 381/56, 58, 22, 23, 94.5, 123, 102, 104, 107, 381/109; 704/500, 503
See application file for complete search history.

(56) References Cited

U.S. PATENT DOCUMENTS

| | | | |
|---|---|---|---|
| 5,042,070 A | 8/1991 | Linna et al. | |
| 5,757,928 A | 5/1998 | Schaar et al. | |
| 5,963,705 A | 10/1999 | Kim et al. | |
| 6,108,584 A | 8/2000 | Edwards | |
| 6,233,394 B1 | 5/2001 | Jeong et al. | |
| 6,341,166 B1 | 1/2002 | Basel | |
| 6,449,371 B1 | 9/2002 | Tan et al. | |
| 6,704,421 B1 | 3/2004 | Kitamura | |
| 6,867,820 B2 | 3/2005 | Jin et al. | |
| 6,895,173 B2 | 5/2005 | Choi | |

FOREIGN PATENT DOCUMENTS

| | | |
|---|---|---|
| JP | 3-125600 A | 5/1991 |
| JP | 3-247107 A | 11/1991 |

(Continued)

*Primary Examiner*—Xu Mei
(74) *Attorney, Agent, or Firm*—Lerner, David, Littenberg, Krumholz & Mentlik, LLP

(57) ABSTRACT

An information signal reproducing apparatus which is capable of forming a suitable reproducing environment and building an easy-handling reproducing system regardless of differences such as signal format or recorded media of audio data to be reproduced is provided, in which: a medium type of an optical disc and signal format information of audio data to be read from the optical disc and to be reproduced are detected by an RF signal processing circuit and a video/audio decoding unit so that a system control unit estimates whether the audio data to be reproduced is a music sound, a movie sound or another type of audio data in accordance with the detected information, and, in accordance with this estimation result, the system control unit and an interface control unit control an audio signal processing unit, an audio volume unit and a speaker amplifier unit so as to carry out a signal processing suitable for the audio data to be reproduced.

16 Claims, 7 Drawing Sheets

FOREIGN PATENT DOCUMENTS

| | | |
|---|---|---|
| JP | 6-23400 U | 3/1994 |
| JP | 6-68189 U | 9/1994 |
| JP | 8-087823 A | 4/1996 |
| JP | 9-185868 A | 7/1997 |
| JP | 10-284960 A | 10/1998 |
| JP | 11-066753 | 3/1999 |

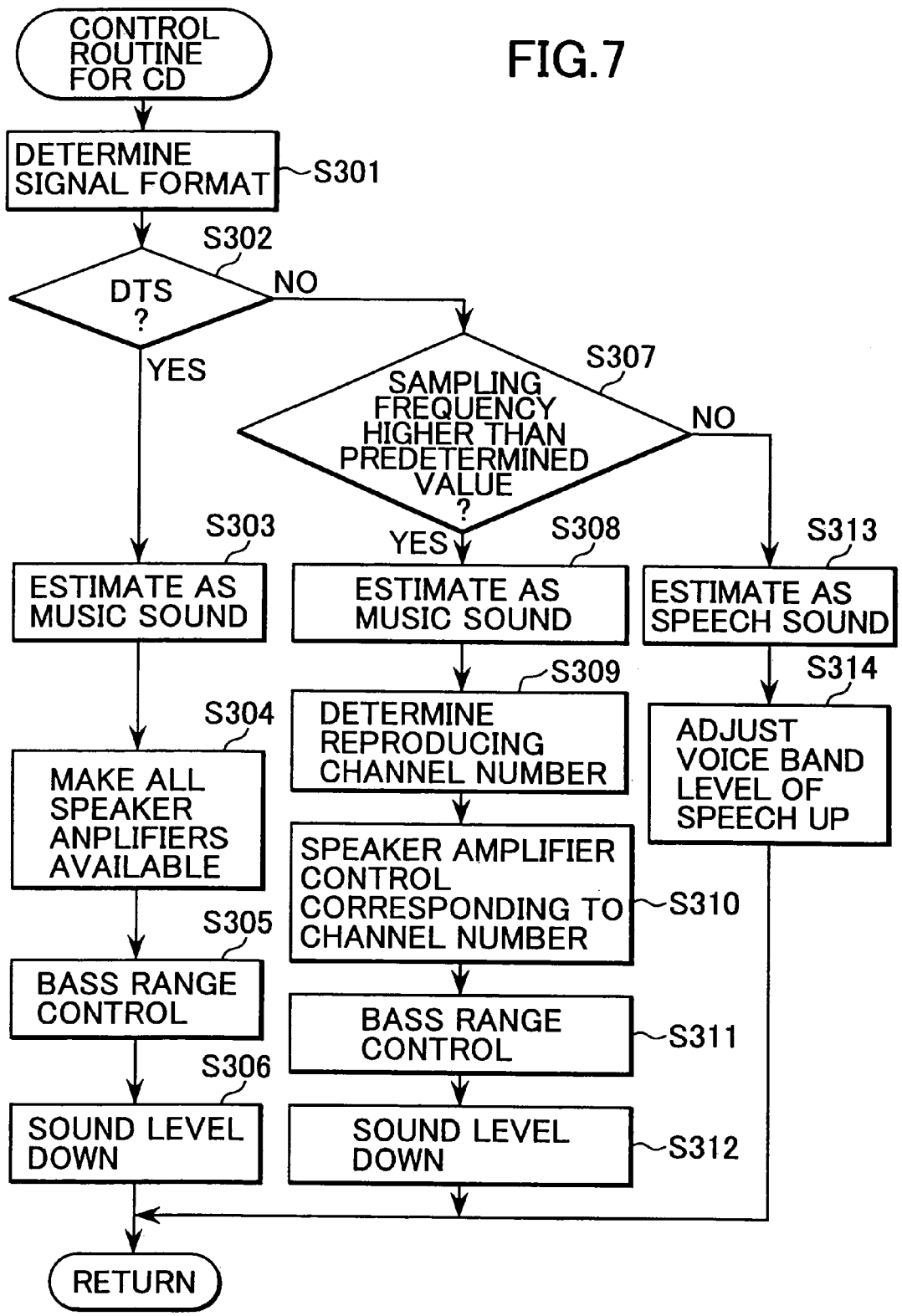

INFORMATION SIGNAL REPRODUCING APPARATUS

CROSS-REFERENCE TO RELATED APPLICATIONS

This application is a continuation of U.S. application Ser. No. 09/799,483, filed on Mar. 5, 2001 now U.S. Pat No. 7,248,935, the disclosure of which is incorporated herein by reference.

BACKGROUND OF THE INVENTION

1. Field of the Invention

This invention relates to information signal reproducing apparatus for reproducing an information signal including audio data recorded in a recorded medium including various kinds of optical discs, for example.

2. Description of the Related Art

An optical disc for music called "CD-DA" (Compact Disc Digital Audio) has been used widely as a recorded medium serving audio data such as music. Audio data encoded in, for example, the LPCM (Linear Pulse Code Modulation) format with which the original sound can be reproduced with relatively high fidelity is recorded in a CD-DA, and it is distributed to an end user. In addition, in late years, a CD-DA in which audio data is recorded by a data storage format called DTS (Digital Theater Systems) has also become available.

This DTS format is an audio reproducing format for forming a sound field with realism using, for example, six speakers called 5.1-channel, which includes five satellite speakers including two front speakers, positioned right and left in front of a listener; a center speaker at the center in front of the listener; two rear speakers, positioned right and left behind the listener, and one sub woofer.

A home audio system supporting the DTS format, which comprises a CD player and speakers capable of reproducing audio data recorded in this DTS format has also become available. It is noted that the "DTS" is a registered trademark of Digital Theater Systems Inc., USA.

In addition, as a recorded medium which provides, for example, digital contents of movies which contain video data of comparatively long time together with audio data such as music, an optical disc called "DVD" (Digital Video Disc/Digital Versatile Disc) has been in practical use.

It is possible to record music information on this DVD. A DVD in which audio data such as music encoded in the LPCM format, for example, with which the original sound can be reproduced with relatively high fidelity as in the above-described case of CD-DA, is recorded is called "DVD-Audio". On the other hand, a DVD in which video data of relatively long time, such as a movie is recorded together with audio data is called "DVD-Video".

In a case of DVD-Video, the video data is compressed in an MPEG (Motion Picture Expert Group) format to be recorded. In addition, with regard to audio data such as music, an effect sound, conversation is recorded after data compression in the AC-3 (Audio Coding algorithm-3rd generation) format or in the above-mentioned DTS format in order to form a reproduced sound field with realism.

However, for example, there are some cases that inconvenience occurs when 2-channel stereo audio data (2-channel stereo source) encoded in the LPCM format and recorded in a CD-DA is reproduced using a home audio system supporting the DTS format.

For example, there is a case that a bass range of the reproduced sound is emphasized too much and there is brought an uncomfortable feeling when the audio data of the 2-channel stereo source is divided into the above-mentioned 5.1-channel channel including five satellite speakers and a sub woofer, using the home audio system supporting the DTS format, as in the above-described case. In this case, a user adjusts an equalizer of the home audio system. However, it is troublesome to get a good reproduced sound quality.

In addition, there is a case where some noise is caused, when the 2-channel stereo source audio data is reproduced by using only two front speakers positioned right and left in front of the listener, among the above-mentioned six speakers of 5.1 channel, by a center speaker, two rear speakers and a sub woofer to which no audio data is supplied and a good reproduced sound field cannot obtained when the audio data of the 2-channel stereo source audio data is reproduced using the home audio system supporting the DTS format, as in the above-described case. In such a case, it is required to adjust the volume level of the speakers not in use and the user may feel it troublesome.

This may possibly occur in a home AV (audio visual) system including a DVD player supporting the DTS format. In other words, in a case of a DVD in which audio data is recorded in a format other than the DTS format, there are some cases that a good reproduced sound field cannot be formed in a home AV system supporting the DTS format.

In addition, a CD and a DVD are both an optical disc and reproducing mechanism on a player thereof and a communication path for a reproducing signal can be commonly used. Accordingly, it is possible to form a so-called multi-mode disc player which is capable of reproducing both information signals recorded in a CD and information signals recorded in a DVD.

However, there is a difference in productive intention between the music information recorded in a CD-DA and the audio data recorded in a DVD-Video. Accordingly, in the case of reproducing audio data using the multi-mode disc player, it is necessary to adjust sound level between the cases of reproducing audio data recorded in the CD-DA and the DVD-Video.

In other words, although music information for listening (for appreciation) is mainly recorded in the CD-DA, an average level of audio data is adjusted to be relatively high to be recorded in the CD-DA in order to satisfactorily reproduce the audio data. On the other hand, there are many cases that contents comprised of video data and audio data of movies or the like are recorded in a DVD-Video. The audio data in this case is audio data incidental to video data, and such audio data is often made as an effective sound, and, an average sound level thereof is set relatively low.

Accordingly, it is necessary for the user to raise the sound levels when the user reproduces and watches the audio data and video data recorded in the DVD-Video after reproducing and listening to the audio data recorded in the CD-DA using the multi-mode disc player.

Conversely, it is necessary for the user to lower the sound levels when the user reproduces and listens to the audio data and recorded in the CD-DA after reproducing and watching the audio data and video data recorded in the DVD-Video using the multi-mode disc player because the audios level set for reproducing the DVD-Video is too high for the CD-DA.

In this way, in a case where a CD player, a DVD player, or a multi-mode disc player capable of reproducing both the information recorded in a CD and the information recorded in a DVD, the user should adjust the equalizer, the volume control or the like to form his/her most preferable reproduced sound field in accordance with a signal format of the audio data or a type of a recorded medium in which the audio data to be reproduced in recorded.

Therefore, if the user wants to have a reproduced sound field in accordance with his/her preference, various adjustments with regard to the reproduced sound are required and it takes a lot of time. In addition, there may be a case where the adjustment goes wrong and a finally obtained reproduced sound field is not fit his/her most preferable environment.

In consideration of the above-described problems, it is an object of the present invention to provide an information signal reproducing apparatus capable of forming a most preferable reproduced sound field which fits the user's preference without being influenced by the signal format of the audio data and the recorded medium to be reproduced and without causing inconvenience to the user, and capable of constructing a user-friendly reproducing system.

In order to accomplish the above-described object, the present invention provides an information signal reproducing apparatus which comprises: signal format detection means for detecting signal format information of audio data contained in an input signal; estimating means for estimating a type of the audio data in accordance with the signal format information detected by the signal format detection means; output control means for controlling output of the audio data in accordance with an estimation result output from the estimating means.

According to the information signal reproducing apparatus of the present invention, the signal format information of the audio data to be reproduced is detected through a reproducing signal by the signal format detection means, and it is estimated whether the audio data is a music sound, a movie sound or a speech sound by the estimating means in accordance with the detected signal format information. In accordance with the estimation result output from the estimating means, the audio data to be reproduced is controlled to be appropriately output by the output control means.

In this way, it is not necessary for a user to do various kinds of adjustment for audio data in accordance with the type of the audio data to be reproduced so that it becomes possible to have a preferable reproduced sound field at any time regardless of the type of audio data. That is, a preferable reproducing environment of audio data can be ready at any time without causing a trouble to the user.

In addition, the information signal reproducing apparatus of the present invention further comprises medium type detection means for detecting type information indicating a type of a recorded medium in which the input signal is recorded, wherein the estimating means estimates the type of the audio data in accordance with the signal format information and a detection result output from the medium type detection means.

According to the information signal reproducing apparatus, the type information indicating the type of the recorded medium in which the audio data to be reproduced is recorded is detected by the medium type detection means through the input signal, and the type of the audio data is estimated by the estimating means in consideration of the detected type information. In accordance with the estimation result output from the estimating means, the audio data to be reproduced is appropriately controlled to be output by the output control means.

In addition, the medium type detection means may detect the type of the recorded medium in accordance with recorded medium selection information indicating that a user selects the recorded medium being a source of the input signal.

In this way, it is possible to estimate the type of the audio data to be reproduced in consideration of the type of the recorded medium in which the audio data to be reproduced is recorded as well as the signal format information, and thus, more accurate estimation can be carried out. As a result, it becomes possible to have a preferable reproduced sound field regardless of the type of audio data and without causing a trouble to the user.

In addition, the information signal reproducing apparatus of the present invention is characterized in that the signal format detection means detects a data storage format or an encoding format of the audio data as the signal format information.

According to this information signal reproducing apparatus, the data storage format or the encoding format of the audio data is detected as the signal format information by the signal format detection means. The data storage format and the encoding format include, for example, LPCM, AC-3, DTS, MPEG and the like. In accordance with these data storage format or the encoding format, the type of the audio data to be reproduced is estimated.

It is possible to estimate the type of the audio data to be, a music sound in a case where the encoding format is LPCM, and a movie sound in a case where the encoding format is AC-3, DTS or MPEG, for example, in accordance with a currently-used status of the encoding format or the like. In addition, it is possible to appropriately control the output of the audio data in accordance with an estimation result based on experience.

In addition, the information signal reproducing apparatus of the present invention is characterized in that the signal format detection means detect a reproducing channel number of the audio data as the signal format information.

According to the information signal reproducing apparatus, the reproducing channel number of the audio data is detected as signal format information by the signal format detection means. For example, 1-channel (monaural), 2-channel (stereo), 4-channel, 5.1-channel (multi-channel) and the like are included in the reproducing channel numbers of the audio data. In accordance with the reproducing channel number, a type of the audio data to be reproduced is estimated.

Accordingly, it becomes possible to estimate the type of the audio data in consideration of the currently-used status (in other words, experience so far) of the channel number, for example, in a case of 1-channel, the audio data is a speech sound; in a case of 2-channel or 4-channel, a music sound; and in a case of 5.1-channel, a movie sound. According to a result of such an educated estimation, it becomes possible to control output of the audio data appropriately.

Furthermore, the information signal reproducing apparatus of the present invention is characterized in that the signal format detection means detects a sampling frequency of the audio data as the signal format information.

According to this information signal reproducing apparatus, the sampling frequency of the audio data is detected as the signal format information by the signal format detection means. The sampling frequency of the audio data may be high in a case of a music sound in order to reproduce the original sound faithfully and may be lower than the case of the music sound in a case of a speech sound. In accordance with a detected sampling frequency, the type of the audio data to be reproduced is estimated.

In this way, in consideration of the used status of the conventional sampling frequency (in other word, experience so far), it becomes possible to estimate the type of the audio data.

According to a result of such an educated estimation, it becomes possible to control output of the audio data appropriately.

In addition, the information signal reproducing apparatus of the present invention is characterized in that the output control means controls an output level of the audio data.

According to this information signal reproducing apparatus, it becomes possible to control output levels of the audio data appropriately in accordance with the type of the audio data. For example, in a case where the estimation result with regard to the type of the audio data output from the estimating means is a music sound, the output level of a sound of the audio data is attenuated, and in a case where the estimation result is a movie sound, the output level of a sound of the audio data is raised. It is preferable that the output volume levels of various audio data are substantially the same regardless of the type of the audio data in consequence.

Furthermore, the information signal reproducing apparatus of the present invention is characterized in that the output control means controls a frequency characteristic of a sound of the audio data.

According to this information signal reproducing apparatus, in a case where an estimation result indicating the type of the audio data output from the estimating means is a movie sound, high audio frequencies of the audio data are controlled; in a case where the estimation result is a music sound, low audio frequencies of the audio data are attenuated; and in a case where the estimation result is a speech sound, voice band components are emphasized. Accordingly, a preferable reproduced sound field can be obtained at any time.

In addition, the information signal reproducing apparatus of the present invention is characterized in that the output control means controls a selection of an output channel of a sound of the audio data.

According to this information signal reproducing apparatus, a sound from an unused channel is muted in accordance with the estimation result indicating the type of the audio data output from the estimating means. In this way, a preferable reproduced sound field can be obtained in accordance with the type of the audio data.

In addition, an information signal reproducing apparatus of another aspect of the present invention includes: channel number detection means for detecting information indicating a reproducing channel number of audio data contained in an input signal; and power source control means for controlling a power supply for an audio data amplifying circuit provided corresponding to each reproducing channel in accordance with the information indicating the reproducing channel number detected by the channel number detection means.

According to this information signal reproducing apparatus, the reproducing channel number of the audio data to be reproduced is detected by the information detection means, and the power is supplied to only a speaker amplifier (power amplifier) corresponding to a speaker in actual use in accordance with the number of reproducing channels. In addition, muting means may be further included so that an unused speaker is disabled so as not to output sound.

In this way, it becomes possible to prevent noise from being emitted from a speaker to which no audio data is supplied and to set a preferable reproducing environment for the audio data without deteriorating the S/N ratio of the reproduced sound field.

In addition, an information signal reproducing apparatus of another aspect of the present invention includes detection means for determining whether or not an input signal contains video data, and a power source control means for receiving the video data and controlling power supply to a video display device which displays a video corresponding to the video data, in accordance with a detection result output from the detection means.

According to the information signal reproducing apparatus, the input signal is detected whether or not it includes video data by the information detection means. In a case where the input signal contains video data, an instruction to apply power is transmitted to a video display device, and in a case where the input signal contains no video data but only audio data, an instruction to cut off the power is transmitted to the video display device. Of course, in a case where the information signal reproducing apparatus of the present invention includes circuits for outputting and displaying the video data, the power supply to such video output circuit and video display circuit may be controlled.

Therefore, in accordance with the existence of the video data, the power supply to the video display device can be controlled. Accordingly, it becomes possible to have a most preferable reproducing environment for audio data and video data without causing any trouble to the user.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 7 is a flowchart for explaining output control of audio data in a case where a recorded medium loaded in the video audio reproducing apparatus as shown in FIG. 1 is determined to be a CD.

DESCRIPTION OF THE PREFERRED EMBODIMENTS

Now, with reference to the drawings, an embodiment of the information signal reproducing apparatus of the present invention will be described in detail. In the embodiment to be explained below, a case where the information signal reproducing apparatus according to the present invention is applied to a multi-mode disc player being an optical disc reproducing apparatus capable of reproducing all of a CD for music (CD-DA), a DVD for video (DVD-Video) and a DVD for audio (DVD-Audio) will be described as an example.

Figure 1:
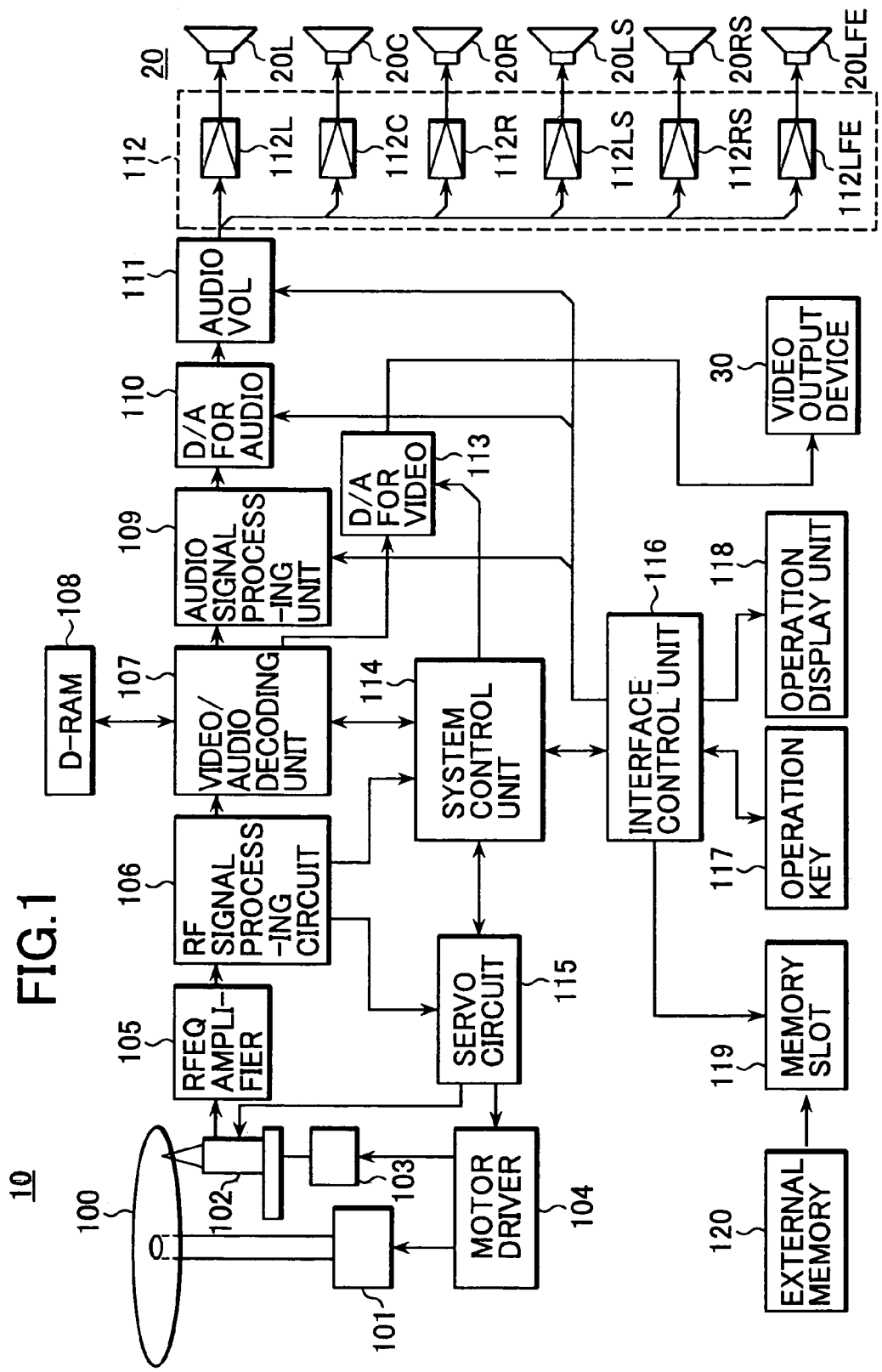
FIG. 1 is a block diagram for explaining a video audio reproducing apparatus to which an embodiment of an information signal reproducing apparatus of the present invention is applied.
Figure 2:
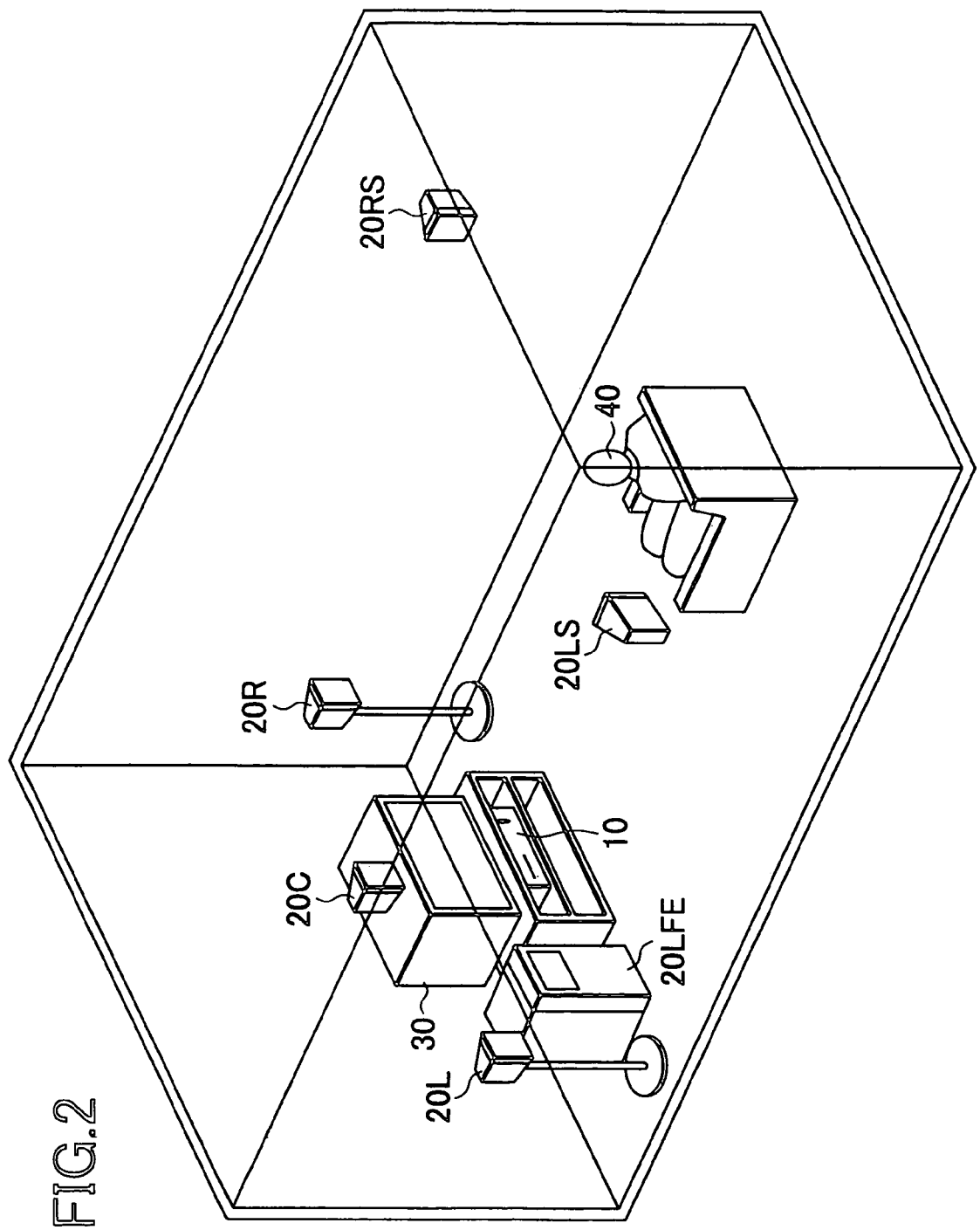
FIG. 2 is a figure for explaining an example of a home video theater constituted with the video audio reproducing apparatus as shown in FIG. 1.

FIG. 1 is a block diagram for explaining a reproducing apparatus (a video/audio reproducing apparatus) 10 for an optical disc, to which the information signal reproducing apparatus of the present invention is applied. FIG. 2 is a figure for explaining a constitution example of a home theater system constituted with the reproducing apparatus 10 of this embodiment.

The reproducing apparatus 10 of the present embodiment is capable of reproducing audio data encoded in the DTS format in accordance with the format. The reproducing apparatus 10 supports the so-called 5.1-channel multi-surround-sound system comprising five satellite speakers and one sub woofer (speaker exclusive for bass tone), including a left front speaker 20L, a right front speaker 20R, a center speaker 20C, a left rear speaker 20LS, a right rear speaker 20RS, and a sub woofer 20LFE.

These six speakers are positioned so as to surround a chair indicating a viewing/listening position of an audience 40, as shown in FIG. 2. In the case shown in FIG. 2, the front speakers 20L and 20R are positioned so that a video output device 30 such as a television receiver, a video monitor or the like is arranged between the front speakers, the center speaker 20C is positioned on the video output device 30, and the sub woofer 20LFE is positioned on the left side of the video output device 30.

In addition, the left rear speaker 20LS and the right rear speaker 20RS are positioned on the left and right walls behind the chair indicating the viewing/listening position of the audience 40 to some extent so that the position of the audience 40 is between the rear speakers 20LS and 20RS. When the speakers are arranged in this way and a movie content recorded in a DVD-Video, in which audio data is encoded in the above-mentioned DTS format is reproduced by the reproducing apparatus of the present embodiment, a reproduced sound field (audio listening environment) with realism, in which bass tone is emphasized, as in a case of watching a movie in a movie theater, can be obtained.

Next, the reproducing apparatus 10 of the present embodiment will be described in detail. In FIG. 1, a disc 100 is an optical disc, such as a CD-DA, a DVD-Video, and a DVD-Audio, as described above. The CD-DA is an optical disc in which audio data of music or the like and audio data of a comic storytelling, a declamation or a conversation encoded in the LPCM format, or audio data of music or the like encoded in the DTS format is recorded.

On the other hand, a DVD-Audio is an optical disc in which mainly audio data of music encoded in various formats is recorded, and a DVD-Video is an optical disc in which video data compressed in a MPEG format and its accompanying audio data, such as audio data compressed in the AC-3 format or the MPEG-Audio format, or audio data encoded in the DTS format are recorded.

The reproducing apparatus 10 of the present embodiment includes a spindle motor 101 for rotationally driving the optical disc 100, an optical pickup unit 102 for irradiating a laser beam onto the optical disc 100 and receiving a reflection light from the optical disc 100 so as to read data recorded in the optical disc 100, and a sled motor 103 for moving the optical pickup unit 102 in a radial direction of the optical disc 100.

The optical pickup unit 102 includes a laser source, an objective lens, an optical system such as a quartered photo-detector, for example, and also a mechanism such as a two-axis actuator for adjusting a position of the optical pickup unit 102 in a direction orthogonal to the optical disc 100 and in a radial direction of the optical disc.

The optical pickup unit 102 irradiates a laser beam onto the optical disc 100 which is rotationally driven by the spindle motor 101, and receives through the photodetector the reflection light from the optical disc 100, which varies in accordance with pits formed on the optical disc 100, converts the received light into an electrical signal to supply it to an RFEQ (RF equalizer) amplifier 105.

The RFEQ amplifier 105 carried out an equalizing processing for the electrical signal supplied thereto so as to supply the electrical signal after the equalizing processing to an RF signal processing circuit 106. The RF signal processing circuit 106 generates a reproducing RF signal (binary digital signal), a servo error signal such as a focus error signal and a tracking error signal, in accordance with the electrical signal received from the RFEQ amplifier 105.

In addition, the RF signal processing circuit 106 extracts, in a case where information such as duplication controlling information, medium type information and signal format information of the reproducing RF signal, for example, are superimposed on video data or audio data as digital watermark information (electronic watermark), for example, these information from the generated reproducing RF signal.

Then, the RF processing circuit 106 supplies the generated reproducing RF signal to a video/audio decoding unit 107 and also supplies the servo error signal such as the focus error signal and the tracking error signal to a servo circuit 115. In addition, the RF processing circuit 106 supplies, in a case where it extracts control information which is superimposed on the reproducing RF signal as digital watermark information, for example, the extracted information to a system control unit 114.

The servo circuit 115 receives various servo error signals supplied from the RF signal processing circuit 106 and a control signal supplied from the system control unit 114 and generates a focus servo signal and a tracking error signal to supply them to the optical pickup unit 102. In this way, focus servo and tracking servo are applied.

In addition, the servo circuit 115 generates a rotational servo signal in accordance with the servo error signal supplied thereto from the RF signal processing unit 106 and the control signal supplied from the system control unit 114, and supplies the rotational servo signal to a motor driver 104.

The motor driver 104 generates a drive signal to be supplied to the spindle motor 101, in accordance with the rotational servo signal for the spindle motor 101 supplied from the servo circuit 115, to supply the drive signal to the spindle motor 101. In addition, the motor driver 104 also generates a drive signal to be supplied to the sled motor 103, in accordance with the rotational servo signal for the sled motor 103 supplied from the servo circuit 115, to supply the drive signal to the sled motor 103. Accordingly, the rotational servo is applied to the spindle motor 101 and the sled motor 103.

In this way, focus servo, tracking servo and rotational servo are applied so that the optical disc 100 rotates at an appropriate speed. Therefore, a laser beam irradiated by the optical pickup unit 102 scans a target track accurately with a beam spot of an appropriate size to read exactly the data recorded in the optical disc 100.

On the other hand, the video/audio decoding unit 107 decodes the reproducing RF signal being a binary digital signal supplied from the RF signal processing circuit 106. As shown in FIG. 1, a D-RAM (Dynamic Random Access Memory) 108 used as a working area for a decoding process, for example, is connected to this video/audio decoding unit 107. The video/audio decoding unit 107 supplies, as will be described later, decoded audio data to an audio signal processing unit 109, and decoded video data to a D/A conversion circuit 113 for video.

In addition, the video/audio decoding unit 107 supplies the information obtained by decoding the reproducing RF signal from an predetermined area of the optical disc 100 in which a medium type or a signal format of audio signal such as an encoding format or a data storage format of audio data, a reproducing channel number, a sampling frequency and the like are recorded (hereinafter, referred to as "decoded information") to the system control unit 114.

The above-mentioned predetermined area of the optical disc, in which the medium type and the signal format are recorded, is a read-in area of the optical disc, TOC (Table of Contents) or a directory area provided at a predetermined position of the optical disc or an area for sync word (information for synchronization).

The system control unit 114 is a microcomputer which includes a CPU, a ROM, a RAM, an EEPROM and the like. The system control unit 114 determines the type of the optical disc 100 loaded in the reproducing apparatus 10; determines whether the optical disc 100 is a disc in which only audio data is recorded or a disc in which video data and audio data are recorded; and further, detects an encoding format and a data storage format of audio data, a reproducing channel number, and a sampling frequency recorded in the optical disc 100.

The medium type indicates whether the optical disc 100 loaded in the reproducing apparatus 10 of the present embodiment is a CD or a DVD. In addition, the encoding format, in the present embodiment, indicates one of the encoding formats including the LPCM format, the AC-3 format, the MPEG audio format and the DTS format, according to which the audio data recorded in the optical disc 100 is encoded.

The reproducing channel number, in the present embodiment, shows the channel number such as monaural, 2-channel stereo, 5.1-channel multi-surround or the like, according to which the reproducing system is formed. In addition, the sampling frequency shows the sampling frequency of audio data encoded in the LPCM format.

Furthermore, it is possible with the reproducing apparatus 10 of the present embodiment to determine whether only the audio data is or both the audio data and the video data are recorded in the optical disc 100. In the present embodiment, in a case of audio data encoded in the DTS format, the reproducing channel number is 5.1-channel multi-surround.

In a case where controlling information is not superimposed, as digital watermark information, for example, on the video data and the audio data recorded in the optical disc 100, the medium type, the encoding format and data storage format of audio data, the reproducing channel number, the sampling frequency and the like is determined in accordance with only the decoded information supplied from the video/audio decoding unit 107.

The system control unit 114 generates a control signal for controlling decoding processing of video data and audio data being the main information according to an analysis result as described above, and supplies the controlling signal to the video/audio decoding unit 107. Here, the controlling signal is information for controlling data to be decoded, that is, both video and audio data or only audio data, and for controlling how to decode the data.

The system control unit 114 notifies an interface control unit 116 of an analysis result as described above. In the present embodiment, the interface control unit 116 is a microcomputer which includes a CPU, a ROM, a RAM, and an EEPROM. The interface control unit 116 controls an operation key unit 117, an operation displaying unit 118 and a memory slot 119, which will be described later as well as an audio system comprising the audio signal processing unit 109, the D/A conversion unit 110 for audio, an audio volume unit (audio VOL in FIG. 1) 111, and a speaker amplifier (power amplifier) unit 112 including a plurality of speaker amplifiers, in accordance with an analysis result. The audio VOL may be processed inside of the audio signal processing unit 109 or may be adjusted by adjusting the volume level of the audio signal supplied to the D/A conversion unit 110 for audio.

In other words, in the reproducing apparatus 10 of the present embodiment, the interface control unit 116 controls the audio system and the system controlling unit 114 controls units other than the audio system so that load of control is dispersed to realize quick and accurate data processing.

In addition, the interface control unit 116 forms display information corresponding to information which is need to be notified to a user, such as the medium type, among analysis results output from the system control unit 114 and supplies the display information to the operation displaying unit 118 comprising LCD (liquid crystal display) or the like so as to display the medium type of an optical disc 100 loaded in the reproducing apparatus 10 of the present embodiment on the operation displaying unit 118 and notify the user of the medium type.

And the video/audio decoding unit 107 decodes, in accordance with the control signal from the system control unit 114, the video data and audio data or only the audio data supplied as a reproducing RF signal (a binary digital signal) from the RF signal processing circuit 106, as described above, according to the encoding format thereof.

For example, in a case where the reproducing RF signal is generated from the video data and audio data compressed in the same format, the video/audio decoding unit 107 decodes and decompresses the reproducing RF signal in which compressed video data and audio data coexist so as to separate the video data and audio data. Then, the video/audio decoding unit 107 supplies the decompressed audio data to the audio signal processing unit 109 and supplies the decompressed video data to the D/A conversion circuit 113 for video.

In addition, in a case where the reproducing RF signal contains both video data and audio data but they are separately encoded in different formats, the video/audio decoding unit 107 separates the video data and the audio data. Then the video/audio decoding unit 107 supplies, without decompressing, the compressed audio data to the audio signal processing unit 109 and decodes and decompresses the video data so as to supply the decompressed video data to the D/A conversion circuit 113 for video.

In addition, in a case where the reproducing RF signal originates in a CD-DA or a DVD-Audio, and contains only audio data but no video data, the video/audio decoding unit 107 carries out a decode processing required for the audio data and supplies it to the audio signal processing unit 109.

And in a case where the supplied audio data is still encoded, that is still compressed, the audio signal processing unit 109 decodes the audio data, in accordance with the control from the interface control unit 116, so as to reconstruct the audio data to be the original audio data.

In addition, in a case where the audio data includes a plurality of reproducing channels, for example, in a case where the audio data is recorded in the optical disc 100 in the DTS format, the audio signal processing unit 109 separates the audio data for each reproducing channel. In addition, the audio signal processing unit 109 digitally carries out an operation on a filtering processing, a delay processing or the like with regard to the audio data to be output and adjusts the frequency characteristic and the output level of the audio data so as to add an aimed effect to the audio data.

In this way, in a case of the audio data which is decoded by the audio signal processing unit 109 and has a plurality of reproducing channels, audio data separated for each reproducing channel is supplied to the D/A conversion circuit 110 for audio. The D/A conversion circuit 110 for audio converts audio data supplied thereto in a digital signal into an analog signal, and supplies the obtained analog audio signal to speaker amplifiers 112L, 112C, 112R, 112LS, 112RS and 112LEF of the corresponding reproducing channels.

Each speaker amplifier amplifies the analog audio signal supplied thereto and supplies the amplified signal to the corresponding speakers 20L, 20C, 20R, 2OLS, 20RS and 20LEF so as to drive these speakers. Therefore, a sound corresponding to the audio data recorded in the optical disc 100 is emitted from each speaker.

In addition, as described above, the video data decoded by the video/audio decoding unit 107 and supplied to the D/A conversion circuit 113 for video is converted from a digital signal to an audio signal to be supplied to the video output device 30 such as a television receiver. In this way, a reproducing video corresponding to the video data recorded in the optical disc 100 is displayed on the display screen of the video output device 30.

The reproducing apparatus 10 of the present embodiment also includes a memory slot 119 being a loading opening for an external semiconductor memory 120 such as a MEMORY STICK (.TM.) in addition to an opening for loading an optical disc. The reproducing apparatus 10 of the present embodiment is constituted so that, by loading an external semiconductor memory 120 in which video data and audio data are recorded by a digital still camera and a digital video camera, or an external semiconductor memory 120 in which audio data is recorded by an recording device in the memory slot 119, the video data and audio data recorded in the external memory 120 can be reproduced.

The interface control unit 116 reads out, through the memory slot 119, the video data and audio data recorded in the external semiconductor memory 120 loaded in the memory slot 119. And, in the present embodiment, the audio data is supplied from the interface control unit 116 to the audio signal processing unit 109 to be reproduced, and the video data is supplied from the interface control unit 116 to the video/audio decoding unit 104 and the D/A conversion circuit 113 for video to be reproduced.

In addition, the reproducing apparatus 10 of the present embodiment accepts an instruction from a user of this reproducing apparatus 10 input through the operation key unit 117 and carries out a process according to the instruction input and sets a parameter corresponding to the instruction input to an EEPROM which is a nonvolatile memory included in the interface control unit 116 or the system control unit 114.

As described above, the reproducing apparatus 10 of the present embodiment is capable of reproducing audio data and video data recorded in various recorded media such as a CD-DA, a DVD-Video, a DVD-Audio or an external semiconductor memory in various formats.

Even if the reproducing apparatus 10 is adjusted to have an equal maximum audio level a maximum sound level when reproducing the audio data from any kind of recorded medium or the audio data of any kind of encoding format, in the case where a CD-DA in which audio data such as music is recorded in a manner that an average audio level is relatively high and a DVD-Video in which audio data such as movie sound is recorded in a manner that an average audio level is relatively low are alternately reproduced, as described above, it becomes necessary to manually adjust the volume level in each case.

In other words, in a case where audio data recorded in a recorded medium different from that in which the currently reproduced audio data is recorded is to be reproduced or a case where audio data encoded in a different format from that of the currently reproduced audio data is to be reproduced, in accordance with the production intention or the difference in production environment of the audio data recorded in a recorded medium, there occurs some cases where the user should manually adjust the reproduced sound so as to listen to the reproduced sound preferably.

Accordingly, in the reproducing apparatus 10 of the present invention, the type of the audio data is estimated according to the medium type or the signal format of the audio data, and output control is carried out to the audio data in accordance with the estimated medium type. Thus, it is possible to listen to the reproduced sound preferably without manual adjustment to the reproduced sound by the user.

[Estimation of Audio Data Type and Output Control of Audio Data]

Figure 3:
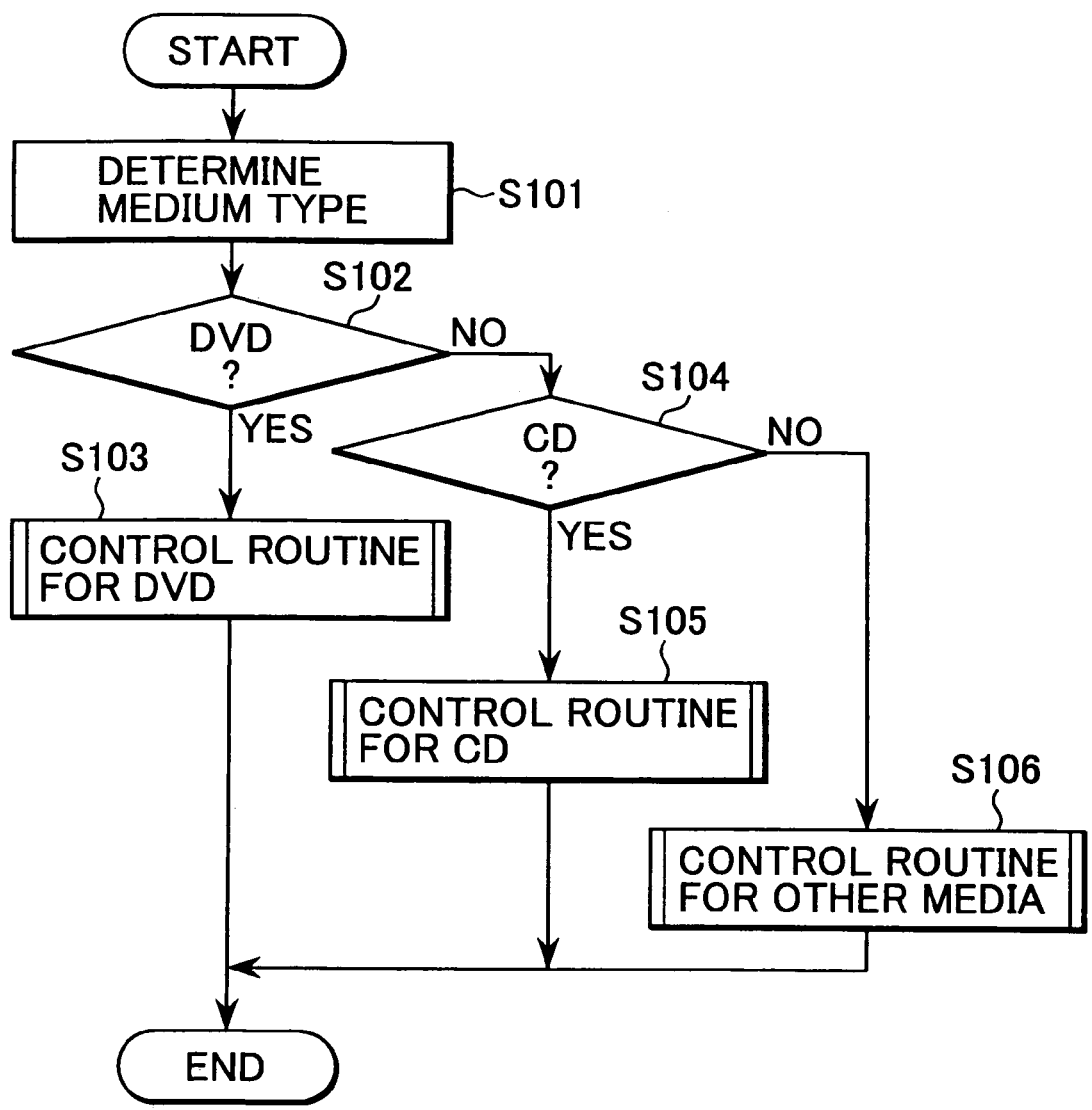
FIG. 3 is a flow chart for explaining output control of audio data carried out in the video audio reproducing apparatus as shown in FIG. 1.

Now, estimation of audio data type and output control of audio data in accordance with an estimation result carried out by the reproducing apparatus 10 of the present embodiment will be described. FIG. 3 is a flowchart for explaining estimation of audio data type and output control of audio data in accordance with the estimation result carried out by the reproducing apparatus 10 of the present embodiment.

The processing shown in FIG. 3 is carried out by the system control unit 114, the interface control unit 116 when an optical disc 100 or an external semiconductor memory 120 is loaded in the reproducing apparatus 10 in the present embodiment. That is, when the optical disc 100 is loaded in the reproducing apparatus 10, the reproducing apparatus 10 rotationally drives the loaded optical disc 100 and irradiates a laser beam from the optical pickup unit 102 to the optical disc 100 to carry out a pretreatment for reading out necessary data recorded in the optical disc 100.

To describe in detail, when the optical disc 100 is loaded in the reproducing apparatus 10, as also described above, the reproducing apparatus 10 reads out data indicating a medium type and a signal format recorded in a predetermined position, such as TOC, a read-in area, a sync word provided before or after the data field.

The read out data (electrical signal) is supplied through the RFEQ amplifier 105 to the RF signal processing circuit 106 as described above, converted into a reproducing RF signal, and supplied to the video/audio decoding unit 107. At this time, in the RF signal processing circuit 106, information superposed on the reproducing RF signal is extracted, and then, the extracted information is supplied to the system control unit 114. In addition, the video/audio decoding unit 107 decodes the reproducing RF signals from a predetermined area, such as TOC or a directory, of the optical disc and supplies the decoded information (decode information) to the system control unit 114.

The system control unit 114 determines whether the optical disc 100 being a source of the audio data and video data to be reproduced is a CD or a DVD in accordance with the information extracted by the RF signal processing circuit 106 or the decode information supplied from the video/audio decoding unit 107 (step In addition, in the reproducing apparatus 10 of the present embodiment, when the external semiconductor memory 120 is loaded in the memory slot 119, the external semiconductor memory 120 is selected as a data source by the reproducing data source selector being a part of the key operation unit 117, and data reproduction from the external semiconductor memory 120 is instructed through the key operation unit 117, the interface control unit 116 determines the recorded medium being a source of the audio data and video data to be reproduced is the external semiconductor memory 120 and notifies the system control unit 114 of the determination. (Step S101).

And, in accordance with a determination result of step S101, the system control unit 114 determines whether or not the recorded medium being a source of the audio data and video data to be reproduced is a DVD (step S102). In the judgment process of step S102, when the recorded medium is determined to be a DVD, the system control unit 114 executes an output control routine of audio data for DVD (step S103), and finishes the process shown in FIG. 3.

In addition, in the judgment process of step S102, when the recorded medium is determined not to be a DVD, the system control unit 114 determines whether or not the recorded medium is a CD (step S104). In the judgment process of the step S104, when the recorded medium is determined to be a CD, the system control unit 114 executes an output control routine of audio data for CD (step S105), and finishes the process shown in FIG. 3.

In addition, in the judgment process of step S104, when the recorded medium is determined not to be a CD, the system control unit 114 executes a control routine for other media (step S106), and finishes the process shown in FIG. 3. In the present embodiment, an output control routine of audio data for other media (that is, the external semiconductor memory) is to be executed in step S106.

[Output Control Processing in a Case of DVD]

Figure 4:
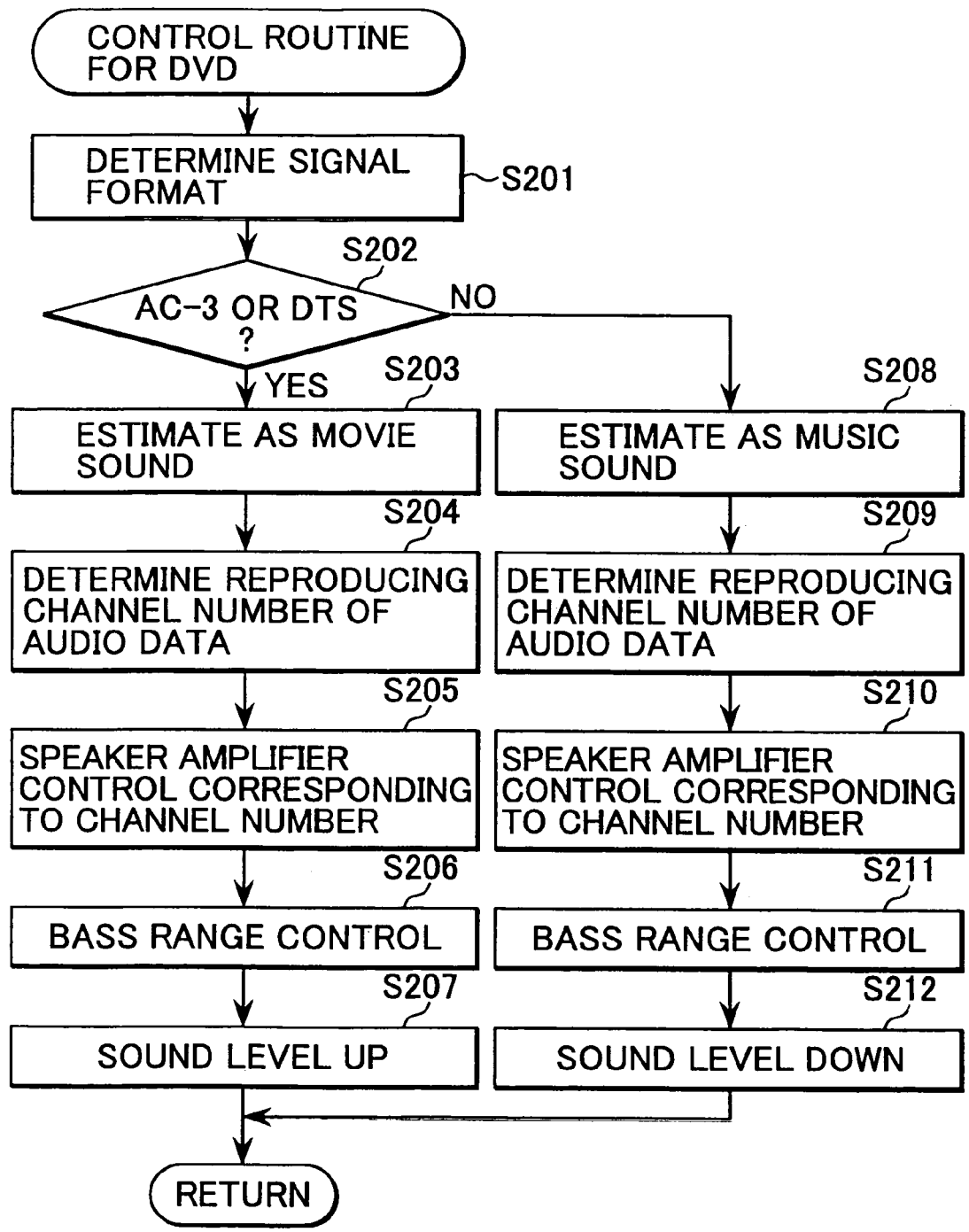
FIG. 4 is a flowchart for explaining output control of audio data in a case where a recorded medium loaded in the video audio reproducing apparatus as shown in FIG. 1 is determined to be a DVD.

FIG. 4 is a process executed in step S103 in the flowchart shown in FIG. 3.

In other words, when the system control unit 114 determines the recorded medium in which the audio data to be reproduced is recorded is a DVD, the system control unit 114 executes the process shown in FIG. 4.

First, the system control unit 114 determines the signal format of the audio data to be reproduced in accordance with the information supplied from the RF signal processing circuit 106 and the decode information supplied from the video/audio decoding unit 107, as described above (step S201). In step S201, the encoding format of the audio data to be reproduced is determined.

And the system control unit 114 determines whether the encoding format of the audio data to be reproduced is the AC-3 format or the DTS format in accordance with the determination result of the step S201 (step S202). In judgment process of the step S202, when the encoding format of the audio data to be reproduced is determined to be the AC-3 format or the DTS format, the audio data to be reproduced is estimated to be a movie sound (step S203).

In other words, in a case of the encoding format of the audio data being the AC-3 format or the DTS format, a digital content of a movie is an overwhelming majority among the digital contents provided by DVDS. In accordance with such an experiential fact, in a case where the recorded medium is a DVD and the encoding format of the audio data recorded in the DVD is the AC-3 format or the DTS format, the reproducing apparatus 10 of the present embodiment estimates that the audio data recorded in the DVD is a movie sound.

And then, the system control unit 114 determines a reproducing channel number of the audio data to be reproduced in accordance with the information supplied from the RF signal processing circuit 106 and the decode information supplied from the video/audio decoding unit 107 (step S204).

Under the control of the interface control unit 116 which receives instruction information according to the determination result of the medium type or the signal format supplied from the system control unit 114, a control of a speaker amplifier corresponding to each speaker in accordance with the reproducing channel number (step S205), a bass-range emphasizing processing by the audio signal processing circuit 109 (step S206) and a volume level up processing by the audio volume unit 111 (step S207) are carried out.

Figure 5:
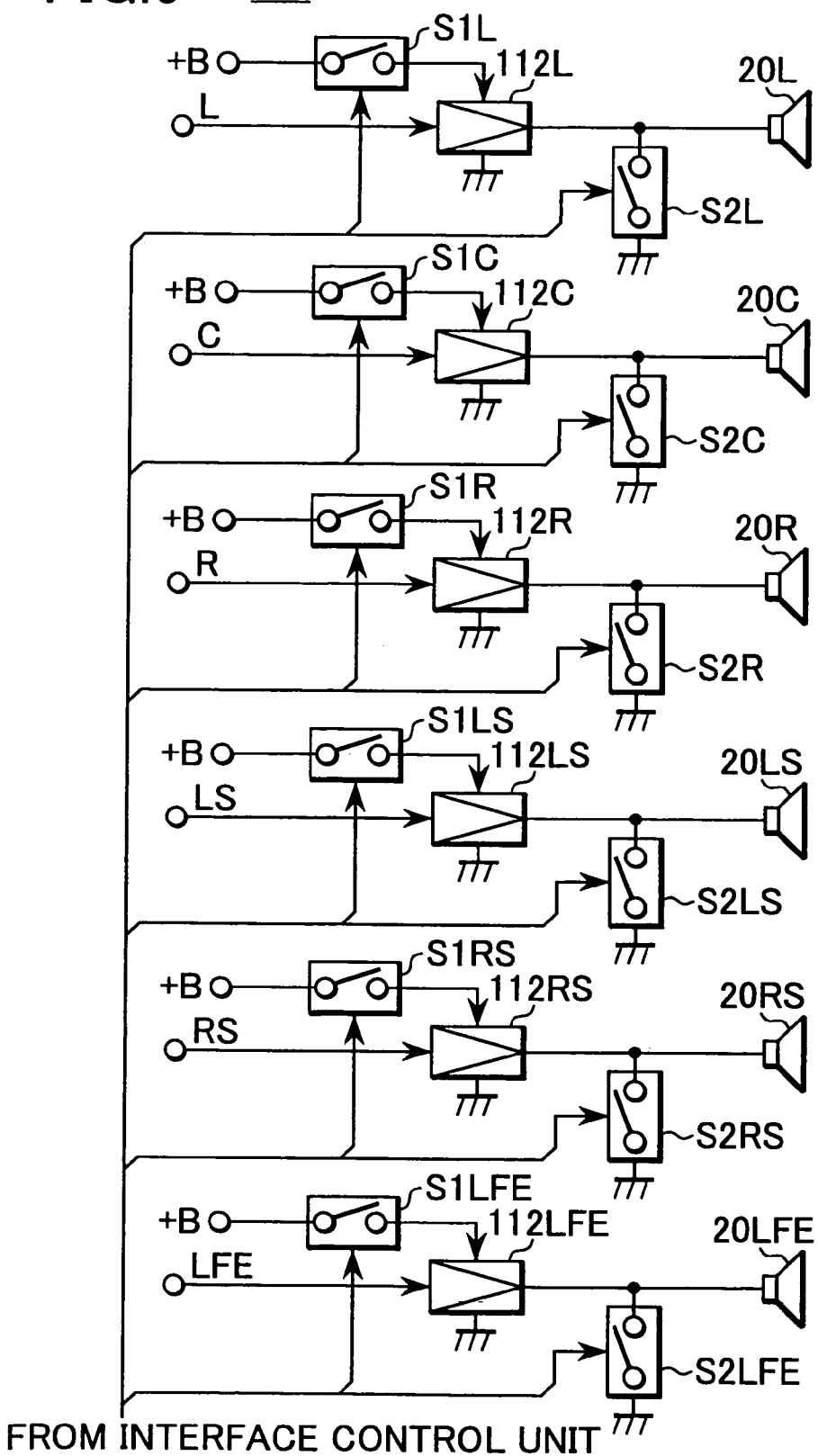
FIG. 5 is a figure for explaining a signal processing of audio data carried out in an audio signal processing unit of the video audio reproducing apparatus as shown in FIG. 1.

Next, each process of the steps S205 to S207 will be explained in the following. First, the control of the speaker amplifier corresponding to the reproducing channel carried out in the step S205 will be described. FIG. 5 is a figure for explaining the speaker amplifier unit 112 of the reproducing apparatus 10 of the present embodiment. As shown in FIG. 5, the speaker amplifiers 112L, 112C, 112R, 112LS, 112RS and 112LEF are provided in correspondence to each speaker.

In addition, in correspondence to each speaker amplifier, power source switches S1L, S1C, S1R, S1LS, S1LRS and S1LFE to control a power supply are provided as well as mute switches S2L, S2C, S2R, S2LS, S2RS and S2LFE for muting a sound signal, as shown in FIG. 5.

And in a case where the reproducing channel number is 2-channel stereo, only the power source switches S1L and S1R are turned on and the other power source switches are turned off in accordance with the control by the interface control unit 116. In this case, each mute switch may be left turned off (that is, a state without muting). Alternatively, only the mute switches S2L and S2R are turned off (that is, a state without muting) and the other mute switches are turned on (that is, a state with muting). In this case, each power source switch may be left turned on.

Of course, both the corresponding power source switches and mute switches may be controlled such that a power source switch of a speaker amplifier to be operated is turned on and a mute switch of the speaker amplifier to be operated is turned off, or, a power source switch of a speaker amplifier not to be operated is turned off and a mute switch of the speaker amplifier not to be operated is turned on. Each mute switch S2 may be arranged in a preceding position of each speaker amplifier unit 112. They only have to substantially mute a signal in each audio channel path.

In addition, in a case where a reproducing channel number is 5.1-channel multi-surround or the signal format of the audio data is the DTS format, each power source switch shown in FIG. 5 is turned on and each mute switch is turned off. In this way, it is possible to realize a preferable reproduced sound field (reproducing environment) without noise even in a case of the audio data being reproduced through two channel stereo, by controlling to operate only the speaker amplifiers of the speakers corresponding to the reproducing channel to be used, or to output audio signal only through the speaker amplifiers of the speakers corresponding to the reproducing channel to be used, according to a reproducing channel number.

Figure 6:
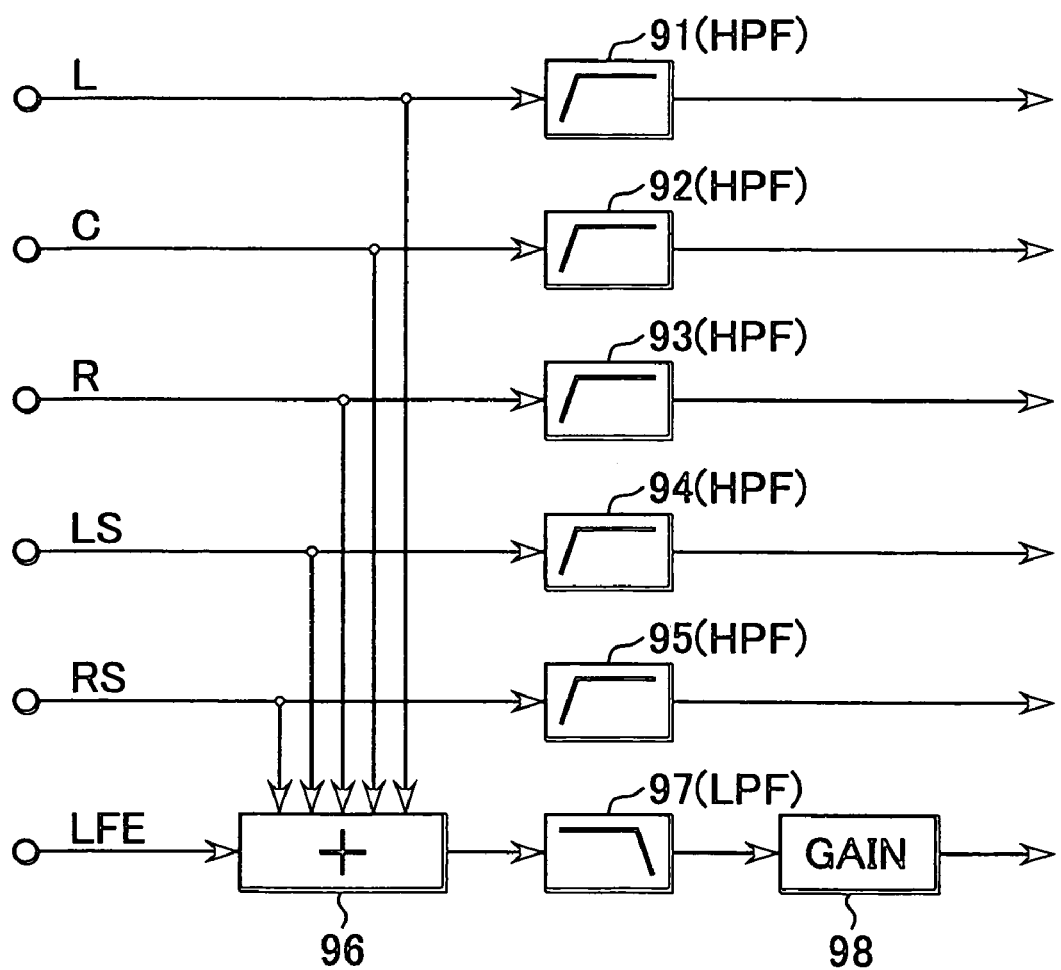
FIG. 6 is a figure for explaining a power supply control and a muting control with regard to speaker amplifiers of the video audio reproducing apparatus as shown in FIG. 1.

Next, a bass range emphasizing processing realized by controlling the audio signal processing unit 109 by the interface control unit 116 in step S206 will be explained. FIG. 6 is a figure for explaining the bass range emphasizing processing of the audio signal carried out in the audio signal processing unit 109 in a case where the audio data is to be reproduced through 5.1 channel multi-surround.

In other words, in the case where the audio data is to be reproduced through 5.1 channel multi-surround, the interface control unit 116 controls the audio signal processing unit 109. For example, as shown in FIG. 6, high pass filters (in FIG. 6, referred to as "HPF") 91, 92, 93, 94, 95 are provided for each of the reproducing channels L, C, R, LS, RS corresponding to the five satellite speakers 20L, 20C, 20R, 20LS, 20RS, respectively. In addition thereto, an addition circuit 96 for adding the audio data of the reproducing channels L, C, R, LS, RS and a low pass filter (in FIG. 6, referred to as "LPF") 97 which receives the output audio data supplied from the addition circuit 96, and a gain adjusting circuit 98 are provided.

The high pass filters (HPF) 91, 92, 93, 94, 95, attenuate the bass tone component of the audio data supplied thereto so as to generate the audio data to be supplied to a corresponding satellite speaker (a speaker other than the sub woofer). In addition, the high tone component is attenuated by supplying the audio data generated by the addition processing by the addition circuit 96 to the low pass filter (LPF) 97. The audio data whose high tone component is attenuated is supplied to the gain adjusting circuit 98 to make a signal level of the audio data whose high tone component is attenuated high to generate the audio data to be supplied to the sub woofer 20 LFE which emphasizes the bass range.

In this way, it is possible to generate the audio data for reproduced sound having reality in which bass range is emphasized, with the function of the audio signal processing unit 109 controlled by the interface control unit 116. In a case where the reproducing channel is 2 channel stereo (for example, L, R), it is possible to emphasize the bass range by, for example, boosting the bass range component of the audio data to be supplied to the front speakers on right and left, or conversely, attenuating the high tone component by the low pass filter. In other words, in this step S206, the gain of the bass range component is made relatively large so as to emphasize the bass tone.

Next, the sound level up processing realized by controlling the audio volume unit 111 by the interface control unit 116 in step S207 will be explained. As is described above, since an average sound level of a movie sound is controlled relatively low in comparison with that of a music sound, the audio volume unit is adjusted so that the signal level of the audio data is high, in step S207.

Accordingly, the signal level of the audio data of a movie to be reproduced is made as high as a predetermined level, and the signal level of various audio data reproduced by the reproducing apparatus 10 is always substantially fixed. The adjustment of the signal level of the audio data may be possible through a digital signal processing in the above-described described audio signal processing unit 109. However, the adjustment with the audio volume unit 111 avoids the so-called bit drop of the audio data and, further, can prevent the reproduced sound from deterioration.

In this way, in a case where the audio data to be reproduced is estimated to be a movie sound, the speaker amplifier unit 112, the audio signal processing unit 109 and the audio volume unit 111 are adjusted to reproduce the movie sound most preferably without causing any trouble to the user. Accordingly, in the case of reproducing the audio data of the movie sound, the reproducing apparatus 10 is automatically adjusted to reproduce the movie sound with reality, in which bass tone is emphasized.

On the other hand, in the determination processing in step S202 of the flowchart shown in FIG. 4, when the encoding format of the audio data to be reproduced is determined not to be the AC-3 format or the DTS format, the system control unit 114 of the reproducing apparatus 10 of the present embodiment estimates that the audio data to be reproduced is a music sound And the system control unit 114 determines a reproducing channel number of the audio data in the similar way to the processing in step S204 described above (step S209). And, as in the processing of step S205 described above, the interface control unit 116 controls one of or both of the power source switch (S1L, S1C, S1R, S1LS, S1RS, S1LFE) and the mute switch (S2L, S2C, S2R, S2LS, S2RS, S2LFE) of the speaker amplifier unit 112 so as to control the speaker amplifier corresponding to the reproducing channel number (step S210).

By the control of the interface control unit 116, different from a case of reproducing the movie sound, the audio signal processing unit 109 is adjusted so as not to emphasize the and do adjustment for audio signal processing unit 109 so that a bass range of a music sound is not emphasized (step S211). The adjustment processing carried out in this step S210 includes a processing for adjusting the function of the audio signal processing unit 109 not to emphasize the bass tone, as explained in reference to FIG. 6, or conversely thereto, to attenuate the bass range component and emphasize the high tone component.

After the processing in this step S211, since an average signal level is set relatively high in the case the music sound as described above, the audio volume unit 111 is adjusted so that the signal level of the audio signal is low (step S212).

In this way, in a case where the audio data to be reproduced is estimated to be a music sound, the speaker amplifier unit 112, the audio signal processing unit 109 and the audio volume unit 111 are adjusted to reproduce the music sound most preferably without causing any trouble to the user. Accordingly, in the case of reproducing the audio data of the music sound, the reproducing apparatus 10 is automatically adjusted to reproduce the music sound without too much emphasized bass tones and with appropriate volume level.

Accordingly, in the case where the recorded medium in which the audio data to be reproduced is recorded is a DVD, the reproducing apparatus 10 is automatically adjusted without causing any trouble to the user so that the audio data recorded in the DVD can be reproduced preferably regardless of the audio data being the movie sound or music sound.

[Output Control Processing in a Case of a CD]

FIG. 7 is a processing carried out in step S105 in the flowchart as shown in FIG. 3. In other words, when the system controlling unit 114 determines that the recorded medium in which the audio data to be reproduced is recorded is a CD, it executes the processing shown in FIG. 7

First, in accordance with the information supplied from the RF signal processing circuit 106 and the decode information from the video/audio decoding unit 107, as described above, the system control unit 114 determines the signal format of the audio data to be reproduced (step S301). In the processing of this step S301, the encoding format and the sampling frequency of the audio data to be reproduced are determined.

In accordance with the judgment processing in step S301, the system control unit 114 determines whether the encoding format of the audio data to be reproduced is the DTS format or not (step S302). When the encoding format of the audio data to be reproduced is determined to be the DTS format in the judgment process in step S302, the system control unit 114 estimates that the audio data to be reproduced is a music sound (step S303).

In other words, in a case of the encoding format of the audio data being the DTS format, the digital content is scarcely the so-called speech sound, such as conversation or a comic story, but digital content majority among the digital contents provided by CDs is the music sound produced by live-recording a concert, for example.

In accordance with this experiential fact, in a case where the recorded medium is a CD and the encoding format of the audio data recorded in the CD is the DTS format, the reproducing apparatus 10 of the present embodiment estimates that the audio data recorded in the CD is a music sound.

In a case where the encoding format of the audio data is the DTS format, in the present embodiment, all of the six speakers are used. Accordingly, the interface control unit 116 which receives instruction information supplied from the system control unit 114 turns on the power source switches of the speaker amplifiers 112L, 112C, 112R, 112LS, 112RS, 112LFE provided for respective speakers so as to supply electric power, as shown in FIG. 5. In addition, the interface control unit 116 turns off the respective mute switches so as not to mute the sound (step S304).

In accordance with the control by the interface control unit 116, the audio signal processing unit 109 is adjusted so that the bass range is not emphasized too much as in the case of reproducing a movie sound (step S305). Thereafter, the interface control unit 116 adjusts a signal level of the music sound whose average sound level is set comparatively high, and adjusts the audio volume unit 111 so that the signal level of the audio data equals to the predetermined level (step S306). Then, the process shown in FIG. 7 is completed.

In this way, in a case where the audio data to be reproduced is estimated to be a music sound encoded in the DTS format, the speaker amplifier unit 112, the audio signal processing unit 109 and the audio volume unit 111 are adjusted to reproduce the music sound encoded in the DTS format most preferably without causing any trouble to the user. Accordingly, in the case of reproducing the-audio data of the music sound encoded in the DTS format, the reproducing apparatus 10 is automatically adjusted to reproduce the music sound without too much emphasized bass tones and with appropriate volume level.

When the encoding format of the audio data to be reproduced is determined not to be the DTS format in the judgment process in step S302, the system controlling unit 114 estimates that the audio data to be reproduced is encoded in the LPCM format, and in accordance with the determination result of the step S301, it determines whether or not the sampling frequency at the time of encoding is more than a predetermined value (step S307).

The determination process of the step S307 is a process for determining the audio data to be reproduced is music information encoded in the LPCM format with a relatively high sampling frequency so as to obtain a reproduced sound as close to the original sound as possible or speech voice having few deterioration in reproduced sound even with a relatively low sampling frequency.

When the sampling frequency is determined to be higher than a predetermined value in the judgment process in step S307, the system control unit 114 estimates that the audio data to be reproduced is a music sound which is required to be reproduced faithfully to the original sound (step S308).

And, the system control unit 114 determines the reproducing channel number of the audio data to be reproduced in accordance with the determination result of step S301 (step S309). The system control unit 114 switches the power source switches and mute switches so as to make only the speaker amplifiers corresponding to the speakers to be used available or to mute the audio signal from the speaker amplifiers corresponding to the speakers not in use (step S310).

And, in accordance with the control by the interface control unit 116, as in the processes of steps S305 and S306 described above, the audio signal processing unit 109 is adjusted so that the bass range is not emphasized too much (step S311). In addition, the interface control unit 116 adjusts a signal level of the music sound whose average sound level is set comparatively high, and adjusts the audio volume unit 111 so that the signal level of the audio data equals to the predetermined level (step S312). Then, the process shown in FIG. 7 is completed.

In this way, even in a case where the audio data to be reproduced is estimated to be a music sound encoded in a format other than the DTS format, the speaker amplifier unit 112, the audio signal processing unit 109 and the audio volume unit 111 are adjusted to reproduce the music sound encoded in the DTS format most preferably without causing any trouble to the user. In other words, the reproducing apparatus 10 is automatically adjusted to reproduce the music sound without too much emphasized bass tone and at an appropriate volume level.

In addition, when the sampling frequency is determined to be lower than a predetermined value in the judgment process in step S307, the system control unit 114 estimates that the audio data to be reproduced is a speech sound with few deterioration in reproduced sound even if its sampling frequency is relatively low (step S313).

In this case, in accordance with the estimation result from the system control unit 114 that the audio data is a speech sound, by the control of the interface control unit 116, the audio signal processing unit 109 is adjusted so as to raise the signal level of the voice band (for example, 200 Hz to 10 kHz) relatively (step S314).

Of course, a determination process of reproducing channel number corresponding to the above described step S309 may be added. In that event, for example, if the reproduced sound is monaural, the power is supplied only to the speaker amplifier 112C and the mute switch S2C is turned off (that is, a state without muting).

In this way, even in a case where the audio data to be reproduced is estimated to be a speech sound, the speaker amplifier unit 112, the audio signal processing unit 109 and the audio volume unit 111 are adjusted to reproduce the speech sound most preferably without causing any trouble to the user.

Accordingly, in the case where the recorded medium in which the audio data to be reproduced is recorded is a CD, the reproducing apparatus 10 is automatically adjusted without causing any trouble to the user so that the audio data recorded in the CD can be reproduced preferably regardless of the audio data being the music sound or speech voice.

[Output Control Processing in a Case of External Semiconductor Memory]

In addition, in the flowchart shown in FIG. 3, in a case where the recorded medium in which the audio data to be reproduced is determined to be neither a DVD nor a CD, the system control unit 114 of the reproducing apparatus 10 of this embodiment determines the recorded medium in which the audio data to be reproduced is an external semiconductor memory loaded in the memory slot 119.

And, in the reproducing apparatus 10 of this embodiment, most of the audio data recorded in the external semiconductor memory is estimated to be the speech sound such as conversation, and an adjustment processing to reproduce the speech sound preferably is carried out in step S106 shown in FIG. 3, as in step S314 shown in FIG. 7. Of course, music data encoded in a compression format such as the ATRAC (Adaptive Transform Acoustic Coding) or MPEG can be recorded in the external semiconductor memory, determination processes with regard to the signal format, sampling frequency, reproducing channel number or the like, as described above, may be carried out.

When the user instructs reproduction of the audio data and video data from the optical disc 100 or the external semiconductor memory 120 loaded in the reproducing apparatus 10, as described above, adjustment to the audio signal processing unit 109, adjustment to the audio volume unit 111, and adjustment to the speaker amplifier unit 112 are carried out to reproduce the audio data in the most suitable state.

In this way, even in the case of reproducing audio data recorded in a different recorded medium or audio data encoded in a different format, reproducing process suitable for the audio data to be reproduced can be carried out. The user can always listen to the reproduced sound in good condition without manual adjustment to the reproduced sound.

In addition, in a system comprising five satellite speakers (satellite channels) and one woofer (channel for bass tone only), such as a home theater system configured with the reproducing apparatus 10 of the present embodiment, in a case of reproducing the audio data of two channel stereo, S/N of the reproduced sound field can be improved by muting channels to which the audio data is not supplied or by stopping the operation of the channel. This usually leads to the improvement in S/N of the rear speaker channels and the noise level of the speaker positioned nearer to the listener can be reduced, which results in an effective reduction of noise in practical use.

And, in the reproducing apparatus 10 of this embodiment, as describe above, the RF signal processing unit 106, the video/audio decoding unit 107 and the system control unit 114 cooperate to detect the medium type of the optical disc loaded in the reproducing apparatus 10 and the signal format of the audio data recorded in the optical disc.

In addition, reproduction of data from an external semiconductor memory is also possible and, in this case, the recorded medium in which the audio data to be reproduced is recorded is detected to be the external semiconductor memory by a function of the interface control unit and the interface control unit 116 notifies the system control unit 114 of it.

Then, the system control unit 114 estimates the type of the audio data to be reproduced in accordance with the detected or notified medium type and the signal format of the audio data, and in accordance with the estimation result, the interface control unit 116 controls the audio signal processing unit 109, the audio volume unit 111, and the speaker amplifier unit 112 so as to carry out an output control suitable for the audio data to be reproduced.

In this way, the RF signal processing unit 106, the video/audio decoding unit 107, the system control unit 114 and the interface control unit 116 have a function as medium type detection means and signal format detection means. In addition, the system control unit 114 also has a function as estimating means for estimating a type of the audio data to be reproduced. Furthermore, the system control unit 114 and the interface control unit 116 have a function as output control means for carrying out an output control suitable for the audio data to be reproduced.

Accordingly, it is possible to optimize the signal processing of the audio data and to realize a reproducing apparatus capable of obtaining a most preferable reproduced sound field by carrying out an output control of the audio data in accordance with the type thereof, without having a large circuit mounted in the reproducing apparatus 10.

With regard to the attenuation of the high range component and bass range component of the audio data carried out in the audio signal processing unit 109, the component to be attenuated may be preliminarily set, in accordance with the preference of the user of the reproducing apparatus 10 and the type of the audio data, for a certain audio data.

In the same way, with regard to the adjustment of the level of the audio data carried out in the audio volume unit 111, the amount of the volume level to be raised or to be lowered may also be preliminarily set for a certain type of audio data in accordance with the preference of the user of the reproducing apparatus 10 and the type of the audio data.

Such an adjustment parameter is accepted by the reproducing apparatus 10 through the key operation unit 117 and, for example, is stored and kept in an EEPROM of the interface control unit 116. And, as has been described above with reference to FIG. 3, FIG. 4, FIG. 7, an actual adjustment can be carried out in accordance with the parameters stored in the EEPROM. In other words, when the user operates a volume dial or the like, values corresponding to the volume level, attenuation/emphasis level of bass/high range components or the like stored in the EEPROM increase or decrease. Accordingly, regardless of the medium type and the signal format of the audio data, the user can listen to the reproduced audio data at a substantially fixed volume position.

In this way, this reproducing apparatus 10 includes a so-called custom mode for making an output control of the audio data in accordance with the instructions of the user and the type of the audio data. And, even if the user does not use the custom mode, the reproducing apparatus 10 may control the output control of the audio data in accordance with the type of the audio data by using the adjustment parameters which were preset on the manufacturing process.

[Power Supply Control of External Equipment]

In addition, the reproducing apparatus 10 of the present is also capable of determining, in accordance with the information recorded in the optical disc or the external semiconductor memory, as has been described above, whether the data recorded therein is comprised of only the audio data or both the video data and audio data.

Then, the reproducing apparatus 10 determines whether contents including the video data are to be reproduced or not. In a case where not only the audio data but the video data is to be reproduced, and the video output device 30 is not powered on, the reproducing apparatus 10 transmits a control signal to the video output device 30 to supply the power thereto. In addition, in a case where only the audio data is to be reproduced, and the power has been supplied to the video output device 30, the reproducing apparatus 10 transmits a control signal to the video output device 30 to shut off the power supplied thereto.

Such a control is carried out by connecting the reproducing apparatus 10 with the video output device 30 using a digital interface in conformity with IEEE1394 standard. And control information to control on/off of a power supply in addition to the video data may be transmitted to from the reproducing apparatus 10 to the video output device 30, through this digital interface.

Accordingly, a digital interface is provided in the reproducing apparatus 10 and the video output device 30, a control signal for controlling on/off of the power supply generated in the interface control unit 116, for example, of the reproducing apparatus 10 is transmitted through the digital interface. On this account, instead of providing the D/A conversion circuit 113 for video on the reproducing apparatus 10, a D/A conversion circuit for video is provided on the video output device 30, and a controlling unit for controlling on/off of the power supply in accordance with a control signal transmitted from the reproducing apparatus 10.

In this case, whether the video output device 30 is powered on or not may be determined between the reproducing apparatus 10 and the video output device 30 through the digital interface. In addition, it is also possible for the reproducing apparatus 10 to manage whether the video output device 30 is powered on or not in a memory thereof and to control on/off of the power supply of a video output device in accordance with the information stored in this memory.

In this way, it is possible to determine a type of an audio signal to be reproduced and to automatically obtain an optimized reproduced sound field as well as to control on/off of a power supply to a speaker amplifier and a video output device, in accordance with information recorded in a recorded medium. In addition, it is not necessary to provide a special circuit in the reproducing apparatus 10 because the output control (a signal processing method) of the audio data is optimized and a power supply is controlled in accordance with the information obtained from the recorded medium. In addition, some of the video output device 30 is configured so that a main power supply for video output is automatically turned off when video data or a video signal is not supplied. For constructing such a video output device, the power supply for a circuit unit for outputting video signal, such as the D/A converter 113 for video provided in the reproducing apparatus 10 may be controlled to be turned on/off in accordance with the presence of video data.

In the above-described embodiment, when the recorded medium is determined to be a DVD, the audio data to be reproduced is also determined to be whether a movie sound or a music sound. However, the present invention is not limited to such a case. In a case where a relatively large number of DVD-Audio's in which audio data only comprised of a speech sound such as a comic storytelling or a lecture is recorded, a process for a case where the audio data is determined to be a speech sound can be added as in the case where the recorded medium is determined to be a CD, as shown in FIG. 7.

In addition, in the above-described embodiment, description is made assuming that the reproducing apparatus 10 is capable of reproducing three kinds of optical discs, CD-DA, DVD-Video and DVD-Audio. However, the present invention is not limited to such a case. A recorded medium called a CD includes the one in which video data is recorded, such as a Video-CD, a CD-G or the like and also includes a new music CD such as an SA-CD (Super Audio CD). In addition, as an optical disc, a large-sized optical disc called an LD (a laser disc) exists.

In this way, it is also possible to specify the audio data to be reproduced and to carry out an output control suitable for the audio data, in accordance with the information including the type of the recorded medium and the signal format of the audio data and video data recorded therein in a case where the reproducing apparatus is constructed to be capable of reproducing not only the CD-DA, DVD-Video and DVD-audio but also the other optical discs, or even a recorded medium called MD (Mini-Disc), recorded tapes such as VHS or 8 mm and further, a semiconductor memory card.

In addition, in a case where an optical disc reproducing apparatus includes a function of receiving a digital television broadcasting or a digital audio broadcasting through a satellite broadcasting, it is possible to carry out an optimum signal processing and to form an optimum reproduced sound field in accordance with a difference in supplying paths and a signal format of the received data. In other words, the information signal reproducing apparatus of the present invention may be constructed to receive a reproducing signal supplied from an external device and to output the signal to a speaker unit, for example, as an AV amplifier (a receiver).

That is, the present invention can be applied to a reproducing apparatus capable of reproducing various optical discs including a CD-DA, an SA-CD as an audio medium for providing audio data as well as a DVD-Video, a Video-CD and a CD-G as a medium for providing audio data and video data.

In addition, in the above-described embodiment, although a case where the present invention is applied to a so-called multi-mode disc player capable of reproducing a CD and a DVD has been explained, the present invention is not limited to such a case. That is, the present invention can also be applied to a reproducing apparatus and a recording/reproducing apparatus for a single recorded medium, such as a DVD player or a CD player. In a case of the reproducing apparatus or the recording/reproducing apparatus for a single recorded medium, it is possible to form the most suitable reproduced sound field by controlling output of audio data and carrying out the most appropriate signal processing in accordance with the type of the audio data to be reproduced.

In addition, although the cases of estimating the music sound, the movie sound and the speech sound have been described in the above-described embodiment as examples, the present invention is not limited such cases. It is possible to determine, for example, in accordance with the information recorded in the recorded medium, whether the music sound in the recorded medium is a classical music or a pop music so as to carry out an output control suitable for the music type determined.

Furthermore, it is also possible to carry out an output control of the audio data in accordance with an offering situation of digital content provided by a recorded medium in a country where the reproducing apparatus is used. In other words, the reproducing apparatus may includes a variety of parameters for carrying out an output control of the audio data in accordance with an estimation result of a type of the audio data, and such parameters may be changed corresponding to countries where the reproducing apparatus is used.

As described above, according to the present invention, in a case of reproducing the audio data of a different signal format, or the audio data recorded in a different recorded medium, the user of the reproducing apparatus can automatically have the most suitable reproduced sound field without being conscious of the characteristic difference of the audio data. Accordingly, the present invention realizes a reproducing apparatus which is extremely easy to use, requiring less adjustment for the reproduced sound and less trouble.

In addition, the output level and the frequency characteristic are adjusted in accordance with the type of the audio data to be reproduced, such as a music sound and a movie sound, so as to create a sound the most appropriate for the audio data, which results in more attractive sound creation.

In addition, in a case where the audio data of 2-channel stereo is reproduced in a system comprising five satellite speakers (satellite channels) and one woofer (channel exclusive for bass tone), such as a home theater system, it is possible to improve the S/N of a reproduced sound field by muting a channel to which no audio data is supplied or stopping the operation of the channel.

In addition, because the on/off control of a power supply of the speaker amplifier and the video output device can be carried out automatically, useless electricity consumption can be reduced.

The invention claimed is:

1. An information signal reproducing apparatus comprising:
   signal format detection means including a decoding unit for decoding an RF signal read from a predetermined area of a recording medium, determining whether both of audio data and video data are contained, and producing decoded information relating to audio data contained in the recording medium, said decoded information including at least a type of said recording medium and an encoding format of audio data to be reproduced;
   estimating means for estimating to which type of a movie sound, a music sound, and a speech sound said audio data corresponds in accordance with the determined result of whether both of audio data and video data are contained and said decoded information produced by said decoding unit of said signal format detection means and for outputting an estimation result;

an amplifier section for producing a signal fed to a loudspeaker to produce an audible sound; and output control means for performing at least one of sound level controlling, frequency characteristic controlling, and output channel selecting for said decoded information over said amplifier section in accordance with said estimation result output from said estimating means, wherein when said estimating means estimates that said audio data corresponds to a music sound, said output control means controls an output level of sound through a selected channel produced by said loudspeaker and amplifier section to be attenuated compared with a highly controlled averaged sound level of the music sound, and when said estimating means estimates that said audio data corresponds to a movie sound, said output control means controls said output level of sound through said selected channel produced by said loudspeaker and amplifier section to be increased compared with a lowly controlled averaged sound level of the movie sound.

2. The information signal reproducing apparatus according to claim 1, further comprising medium type detection means for detecting type information indicating a type of the recording medium on which said input signal is recorded and for outputting a detection output, wherein said estimating means estimates said type of audio data corresponds to a movie sound, a music sound, or a speech sound in accordance with said signal format information and said detection output supplied from said medium type detection means.

3. The information signal reproducing apparatus according to claim 2, wherein said medium type detection means detects recorded medium type information contained in said input signal.

4. The information signal reproducing apparatus according to claim 2, wherein said medium type detection means detects said type of said recording medium in accordance with recorded medium selection information indicating a selection by a user of said recorded medium as a source of said input signal.

5. The information signal reproducing apparatus according to claim 1, wherein said signal format detection means detects a data storage format of said audio data as said decoded information.

6. The information signal reproducing apparatus according to claim 1, wherein said signal format detection means detects an encoding format of said audio data as said decoded information.

7. The information signal reproducing apparatus according to claim 1, wherein said signal format detection means detects a reproducing channel number of said audio data as said decoded information.

8. The information signal reproducing apparatus according to claim 1, wherein said signal format detection means detects a sampling frequency of said audio data as said decoded information.

9. The information signal reproducing apparatus according to claim 1, wherein said output control means controls a frequency characteristic of a sound of said audio data.

10. The information signal reproducing apparatus according to claim 9, wherein when said estimating means estimates said audio data to correspond to a music sound, said output control means controls a bass range component of a sound of said audio data to be attenuated.

11. The information signal reproducing apparatus according to claim 9, wherein when said estimating means estimates said audio data to correspond to a movie sound, said output control means controls a bass range component of a sound of said audio data to be emphasized.

12. The information signal reproducing apparatus according to claim 9, wherein when said estimating means estimates said audio data to correspond to a speech sound, said output control means controls a voice band component of a sound of said audio data to be emphasized.

13. The information signal reproducing apparatus according to claim 1, wherein said output control means controls selection of an output channel of a sound according to said audio data.

14. The information signal reproducing apparatus according to claim 13, further comprising muting means for disabling output of said audio data by said loudspeaker and amplifier section according to said audio data, wherein said output control means activates said muting means corresponding to said output channel whose audio output according to said audio data is to be disabled in accordance with said estimation result of said estimating means.

15. An information signal reproducing apparatus comprising:
    means for reading data recorded on a recording medium, said recording medium having either audio data or audio and video data recorded therein;
    estimating means for estimating a type of sound corresponding to the audio data of the recording medium, in which the type of sound is either a movie sound or a music sound;
    means for producing a signal from the audio data read from the recording medium for supply to a loudspeaker so as to produce an audible sound; and
    control means for controlling a sound level of the audible sound in accordance with an estimated type of sound from said estimating means,
    said output control means controls said sound level so as to be attenuated or lowered when said estimating means estimates that said audio data corresponds to the music sound, and said output control means controls said sound level so as to be increased when said estimating means estimates that said audio data corresponds to the movie sound.

16. An information signal reproducing apparatus comprising:
    a circuit to read data recorded on a recording medium, said recording medium having either audio data or audio and video data recorded therein;
    an estimating device to estimate a type of sound corresponding to the audio data of the recording medium, in which the type of sound is either a movie sound or a music sound;
    a circuit to produce a signal from the audio data read from the recording medium for supply to a loudspeaker so as to produce an audible sound; and
    a controller to control a sound level of the audible sound in accordance with an estimated type of sound from said estimating device,
    said controller being operable to control said sound level so as to be attenuated or lowered when said estimating device estimates that said audio data corresponds to the music sound, and said controller being operable to control said sound level so as to be increased when said estimating device estimates that said audio data corresponds to the movie sound.

* * * * *